United States Patent [19]

Cottrell

[11] Patent Number: 4,463,402
[45] Date of Patent: Jul. 31, 1984

[54] SAFETY JUMPER CABLE APPARATUS

[76] Inventor: Gerald G. Cottrell, R.R. 4, Box 55, Osseo, Wis. 54758

[21] Appl. No.: 476,046

[22] Filed: Mar. 22, 1983

Related U.S. Application Data

[63] Continuation of Ser. No. 162,403, Jun. 24, 1980, abandoned.

[51] Int. Cl.³ .............................................. H02H 7/18
[52] U.S. Cl. ....................................... 361/77; 320/25; 320/39; 320/40; 320/53; 339/29 B
[58] Field of Search ................... 320/25, 26, 39, 40, 320/47, 48, 53–55, 28, DIG. 2; 361/77, 86, 88, 90; 339/28, 29, 29 B, 224

[56] References Cited

U.S. PATENT DOCUMENTS

| | | | |
|---|---|---|---|
| 3,129,373 | 4/1964 | Godshalk et al. | 339/224 |
| 3,267,452 | 8/1966 | Wolf | 339/28 X |
| 3,281,816 | 10/1966 | Raymond | 320/25 |
| 3,300,702 | 1/1967 | Noddin . | |
| 3,307,097 | 2/1967 | Brewster | 320/25 |
| 3,308,365 | 3/1967 | St. John | 320/25 |
| 3,348,117 | 10/1967 | Howden | 320/25 |
| 3,365,645 | 1/1968 | Jacobs | 320/25 |
| 3,406,318 | 10/1968 | Harland, Jr. et al. | 320/25 |
| 3,406,318 | 10/1968 | Harland, Jr. et al. . | |
| 3,470,440 | 9/1969 | Rheingold et al. . | |
| 3,593,101 | 7/1971 | Emmasingel | 320/25 |
| 3,659,183 | 4/1972 | Carlson | 320/25 |
| 3,781,631 | 12/1973 | Nelson et al. . | |
| 3,800,209 | 3/1974 | Minear . | |
| 4,145,648 | 3/1979 | Zender . | |
| 4,163,134 | 7/1979 | Budrose | 339/29 B X |
| 4,166,241 | 8/1979 | Frant | 320/25 |
| 4,180,746 | 12/1979 | Giuffra | 320/26 |
| 4,217,534 | 8/1980 | Cole | 320/25 |
| 4,233,552 | 11/1980 | Baumbach | 320/25 |
| 4,238,722 | 12/1980 | Ford | 339/29 B X |
| 4,272,142 | 6/1981 | Zapf | 339/29 B |
| 4,349,774 | 9/1982 | Farque | 320/25 |
| 4,361,795 | 11/1982 | Santilli | 320/26 |
| 4,400,658 | 8/1983 | Yates | 320/26 |

Primary Examiner—Patrick R. Salce
Attorney, Agent, or Firm—Kinney & Lange

[57] ABSTRACT

Saftey jumper cable apparatus includes first and second cables, first and second connectors for connection of the cables to the rescue vehicle, third and fourth connectors for connection of the cables to the disabled vehicle and circuitry which prevents reverse or cross connection of the cables or shorting of the connectors.

12 Claims, 11 Drawing Figures

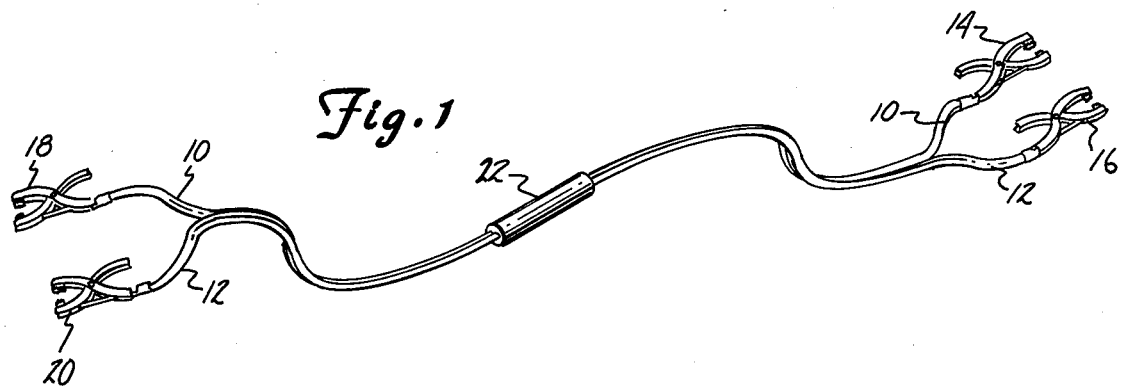
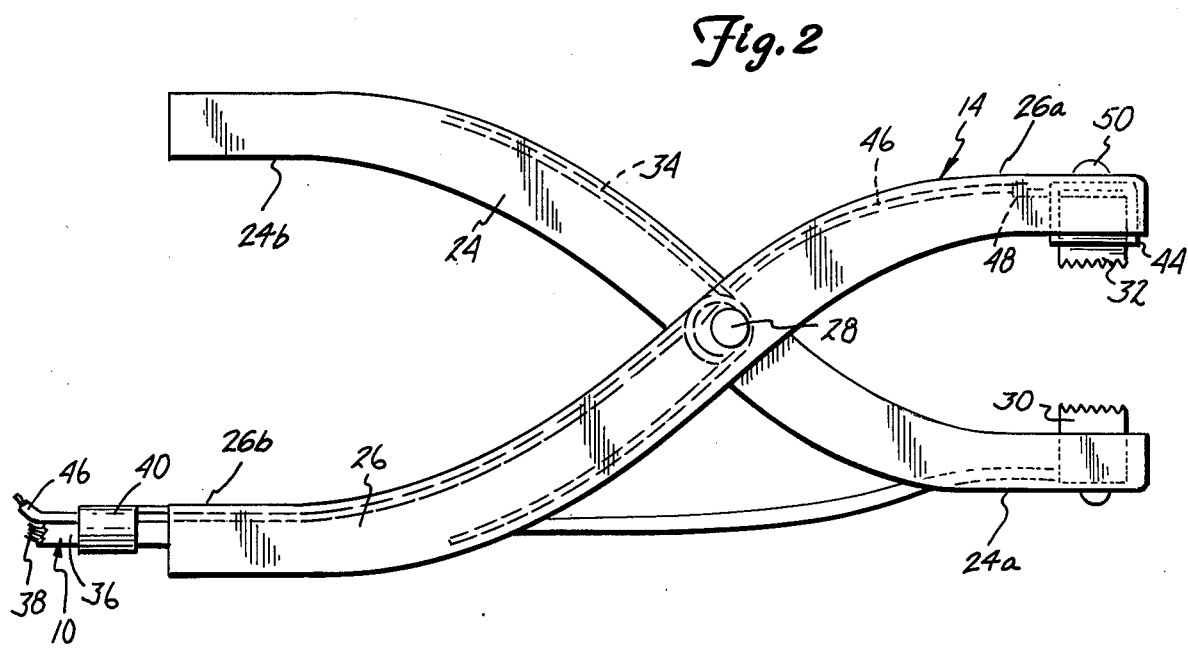
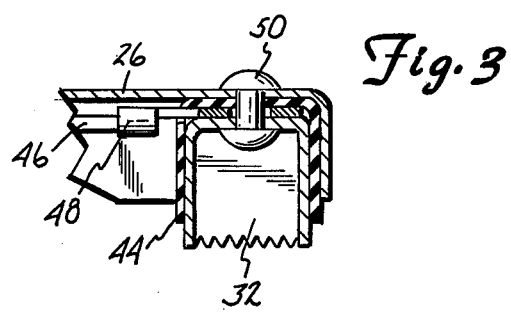
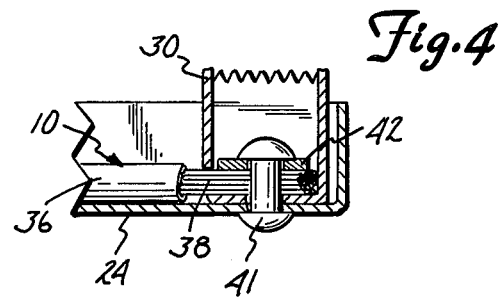

SAFETY JUMPER CABLE APPARATUS

This is a continuation of application Ser. No. 6,162,403, filed June 24, 1980, now abandoned.

BACKGROUND OF THE INVENTION

1. Field of the Invention

The present invention is related to jumper or booster cables, and in particular to jumper cables having protective circuitry to prevent reverse connection or short circuiting of the cable connectors.

2. Description of the Prior Art

There are many situations in which a vehicle's regular battery can become run down or otherwise defective to the point of not being able to furnish sufficient direct current (DC) power to start or maintain operation of the vehicle's engine. One common method of starting a "disabled vehicle" with a dead or defective battery is by use of "jumper cables". In this method, a vehicle (the "rescue vehicle") which is running is used to provide electrical power to the "disabled vehicle". The jumper cables are a pair of electrical conductors having clamp-type connectors at their ends which are used to clamp onto electrical terminals of the rescue vehicle and the disabled vehicle.

Typical jumper cables are color coded, with one cable being black and the other cable being red. The red cable is for connection between the positive terminals of the rescue vehicle and the disabled vehicle, and the black cable is for connection between the negative or ground terminals of the rescue vehicle and the disabled vehicle.

Despite the color coding of the jumper cables, reverse polarity connections are possible. This is particularly the case when persons who are generally unfamiliar with the electrical system of the vehicle or unfamiliar with the use of jumper cables attempt to connect and use the jumper cables. The reverse polarity connection of the cables, or the shorting of the connectors of the cable, can result in arcing, thereby creating a risk of igniting acid fumes around the battery and producing an explosion. In the event that a reverse polarity connection is made, not only the battery of the disabled vehicle can be damaged, but also electrical components of the electrical system, such as the alternator diodes, can be damaged.

SUMMARY OF THE INVENTION

The present invention is a jumper cable apparatus which includes protective circuitry for preventing reverse polarity connection or short circuiting of the connectors of jumper cables.

The present invention includes first and second cable means for connection between the electrical systems of two vehicles. The apparatus includes first and second connectors for connection to the electrical terminals of the first vehicle and third and fourth connectors for connection to the terminals of the second vehicle. The first cable means provides a first current path between the first and third connectors, and the second cable means provides a second current path between the second and fourth connectors. Control means prevents current flow in at least one of the first and second current paths (and in preferred embodiments, both paths) unless (a) the voltage between the third and fourth connectors has a predetermined polarity and a magnitude greater than a predetermined threshhold level, and (b) the voltage between at least one other pair of the connectors has a predetermined polarity and a magnitude greater than a predetermined threshhold level.

BRIEF DESCRIPTION OF THE DRAWINGS

FIG. 1 is a perspective view showing a preferred embodiment of the jumper cables of the present invention.

FIG. 2 is a view of one of the connectors of the jumper cables shown in FIG. 1.

FIG. 3 is a sectional detailed view showing the upper jaw of the connector of FIG. 2.

FIG. 4 is a sectional detailed view showing the upper jaw of the connector of FIG. 2.

DETAILED DESCRIPTION OF THE PREFERRED EMBODIMENTS

Figure 5:
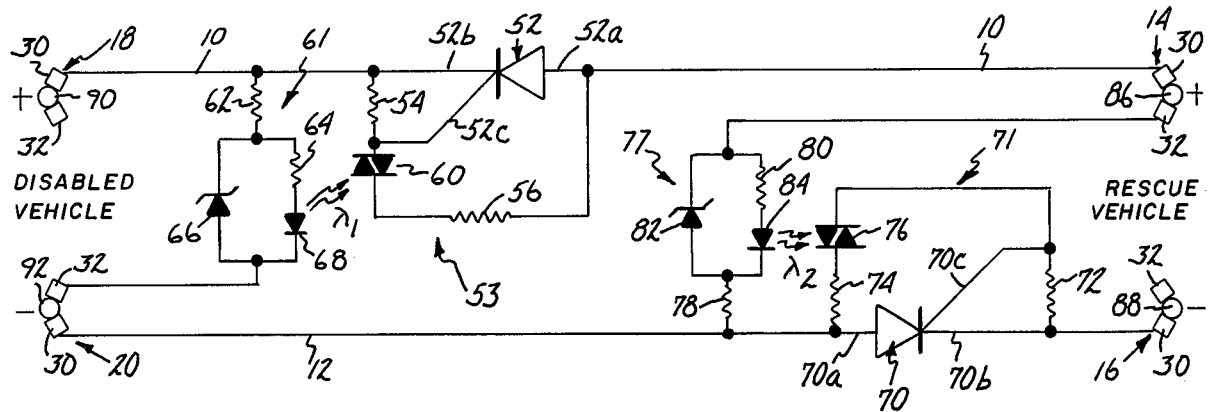
FIGS. 5 through 11 are electrical schematic diagrams of seven alternative preferred embodiments of the control circuitry of the jumper cables of the present invention.

FIG. 1 shows a preferred embodiment of the safety jumper cable apparatus of the present invention. The apparatus includes first cable 10, second cable 12, first and second connectors 14 and 16 for connection to electrical terminals of a rescue vehicle, third and fourth connectors 18 and 20 for connection to electrical terminals of a disabled vehicle, and housing 22, which houses circuitry for preventing unsafe or incorrect use of the jumper cable apparatus.

FIG. 2 is a detailed view of first connector 14. In a preferred embodiment of the present invention, second, third and fourth connectors 16, 18 and 20, respectively, are of generally similar construction to that of the first connector 14, and therefore a detailed description of each of the connectors will not be included in this specification.

As shown in FIG. 2, connector 14 includes a pair of metal arm members 24 and 26 which are pivotally connected by rivet 28. Mounted at outer or far ends 24a and 26a of arms 24 and 26 are electrically conductive metal jaws 30 and 32, respectively. Jaws 30 and 32 engage a terminal of the electrical system of the rescue vehicle.

Torsion spring 34 applies force to arms 24 and 26 to bring jaws 30 and 32 toward one another. This provides reliable clamping of jaws 30 and 32 to the terminal. When the user wishes to separate jaws 30 and 32, he squeezes together handle ends 24b and 26b of arms 24 and 26.

As shown in FIGS. 2 and 3, cable 10 extends through handle end 26b of arm 26 to jaw end 24a of arm 24, where it is electrically connected to lower jaw 30. Cable 10 preferably has an inner core of wire 36 with an outer insulating sheath or cover 38. Cable 10 is held by mounting bracket 40 which is attached to handle end 26b of arm 26. Rivet 41 and washer 42 connect wire 36 of cable 10 to lower jaw 30. In the embodiment shown in FIGS. 2 and 3, jaw 30 is in direct electrical contact with arm 24, and rivet 41 and washer 42 may be electrically conductive.

Upper jaw 32 is electrically insulated from arm 26 (and thus from lower jaw 30) by insulator 44. Wire 46 extends through bracket 36 and along the inner surface of arm 26 to upper jaw 32, where it is electrically connected to upper jaw 32 by connector 48. Electrically insulating rivet 50, which may for example, be nylon, fastens upper jaw 32 to arm 26 while maintaining upper jaw 32 and wire 46 electrically insulated from arm 26.

By providing lower and upper jaws 30 and 32 which are electrically insulated from one another, it is possible to monitor whether proper electrical contact to a vehicle's electrical terminal has been made by jaws 30 and 32 by monitoring the electrical potential present on wire 46. Since jaw 32 is electrically insulated from jaw 30, except when jaws 30 and 32 are clamped about a conductive material such as a battery terminal, jumper cable connector 14 shown in FIGS. 2–4 provides a switch by which the clamping of connector 14 to a terminal can be monitored.

FIGS. 5 through 11 show seven alternative embodiments of control circuitry used in the jumper cable apparatus of the present invention. In these Figures, the jaw to which the cable is connected is designated with reference numeral 30, and the other jaw (to which in some cases a switch wire such as wire 46 shown in FIGS. 2 and 4 is connected) is designated with reference numeral 32 for all four connectors. For ease of illustration, only the jaws of connectors 14, 16, 18 and 20 are illustrated in FIGS. 5–11.

The Circuit of FIG. 5

In the circuit shown in FIG. 5, first silicon controlled rectifier (SCR) 52 has its anode 52a and cathode 52b connected in a series conduction path with cable 10 between jaws 30 of connectors 14 and 18. Connected to gate electrode 52c of SCR 52 is gating circuit 53 which includes resistors 54 and 56.

Connected between terminal 30 of connector 18 and terminal 32 of connector 20 is voltage sensing circuit 61 which includes resistors 62 and 64, Zener diode 66, and light emitting diode 68. Resistors 62 and 64 limit current flow through light emitting diode 68, and Zener diode 66 provides a reference potential across the series connection of resistor 64 and light emitting diode 68. In the embodiments shown in FIG. 5, light emitting diode 68 emits light only when a voltage of a proper polarity and sufficient magnitude is established between connectors 18 and 20. In this embodiment, connector 18 must be connected to a terminal which is positive with respect to the terminal to which connector 20 is connected in order to cause light emitting diode 68 to emit light.

Photosensitive triac 60 is normally in a nonconductive state, which maintains gating circuit 53 in a nonconductive state, and thus prevents SCR 52 from turning on. When light emitting diode 68 emits light, triac 60 is triggered on, thus causing a gate signal to be applied to gate electrode 52c of SCR 52. This enables SCR 52 to turn on, provided that the voltage at connector 14 is positive with respect to the voltage at connector 18.

In other words, SCR 52 will be turned on only if two conditions are met. First, the voltage between connectors 18 and 20 must have the proper polarity and magnitude in order to turn on light emitting diode 68, and thus trigger on photosensitive triac 60. Second, the voltage between connector 14 and connector 18 must be of the proper polarity and magnitude so that the anode-to-cathode of SCR 52 is forward biased.

The circuitry shown in FIG. 5 includes a second SCR 70 having its anode 70a and its cathode 70b connected in a series conduction path with cable 12 between jaws 30 of connectors 16 and 20. Connected to gate electrode 70c of SCR 70 is a second gating circuit 71 formed by resistors 72 and 74 and light sensitive triac 76. Operation of triac 76, and thus the gate circuit 71 is controlled by a second voltage sensing circuit 77 formed by resistors 78 and 80, Zener diode 82, and light emitting diode 84.

The second voltage sensing circuit 77 senses the voltage between jaw 32 of connector 14 and jaw 30 of connector 20. When this voltage has the proper magnitude and polarity to cause light emitting diode 84 to emit light, triac 76 is triggered to a conductive state, thus causing a gating signal to be applied to gate electrode 70c of SCR 70. Provided the voltage between connectors 20 and 16 is of sufficient magnitude and polarity to forward bias the anode 70a—cathode 70b current path, SCR 70 will turn on when the gating signal is received.

The circuitry of the present invention, as shown in FIG. 5, requires four voltage conditions to be met before operation of the jumper cables is possible. First SCR 52 senses the voltage between connectors 14 and 18; the first voltage sensing circuit 61 senses the voltage between connectors 18 and 20; second SCR 70 senses voltage between connectors 16 and 20; and second voltage sensing circuit 77 senses voltage between connector 14 and connector 20. Only if all four of these measurements indicates proper polarity connection will the jumper cable apparatus operate. If one or more of the voltage measurements indicates improper connection of connectors 14, 16, 18 or 20, either SCR 52 or SCR 70, or both, will not conduct.

In the schematic diagram shown in FIG. 5, the proper connections of connectors 14, 16, 18 and 20 are shown. Connector 14 is connected to plus terminal 86 of the rescue vehicle, and connector 16 is connected to minus terminal 88 of the rescue vehicle. Connector 18 is connected to plus terminal 90 of the disabled vehicle, and connector 20 is connected to the minus terminal 92 of the disabled vehicle. With these connections, both first SCR 52 and second SCR 70 are triggered into operation. With these connections, connector 14 is more positive than connector 18, thus forward-biasing SCR 52; connector 18 is positive with respect to connector 20 so that light emitting diode 68 is turned on and emits light; connector 20 is more positive than connector 16 so that SCR 70 is forward-biased, and connector 14 is positive with respect to connector 20 so that light emitting diode 84 is turned on. With this connection, therefore, both SCR 52 and SCR 70 are triggered to conductive states, permitting current to flow from positive terminal 86 of the rescue vehicle to positive terminal 90 of the disabled vehicle, and from negative terminal 92 of the disabled vehicle to negative terminal 88 of the rescue vehicle.

Reverse connections of connectors 14 and 16 at the rescue vehicle end and/or connectors 18 and 20 at the disabled vehicle end will not permit both SCR 52 and SCR 70 to be turned on. One or both of the SCRs will remain in a nonconductive state, thus blocking operation.

Even when the jumper cables are turned end-for-end, so that connectors 14 and 16 are connected to the disabled vehicle and connectors 18 and 20 are connected to the rescue vehicle, the connectors cannot be connected in such a fashion that all four sensed voltage conditions are met.

The circuit of FIG. 5 also provides short circuit protection. If connectors 18 and 20 are connected together, the apparatus will not operate, since the voltage between connectors 18 and 20 is no longer sufficient to operate light emitting diode 68 and thus trigger photosensitive triac 60. As a result, SCR 52 does not turn on. Similarly, if connectors 14 and 16 are shorted together, light emitting diode 84 will not operate, thus preventing SCR 70 from being turned on.

The circuitry of FIG. 5 also affords protection against a potentially dangerous condition which can occur if the vehicles have their bumpers in physical contact, thus providing a ground path between the negative terminals of the two vehicles. Even under this condition, the circuitry of FIG. 5 permits operation only when connectors 14, 16, 18 and 20 are connected to the proper terminals. Even though the touching bumpers of the two vehicles in effect shorts the connection between negative terminals 88 and 92, the voltage sensing circuitry prevents operation if the connectors are reverse connected, the connectors are shorted together, or the apparatus is turned end-for-end.

Figure 6:
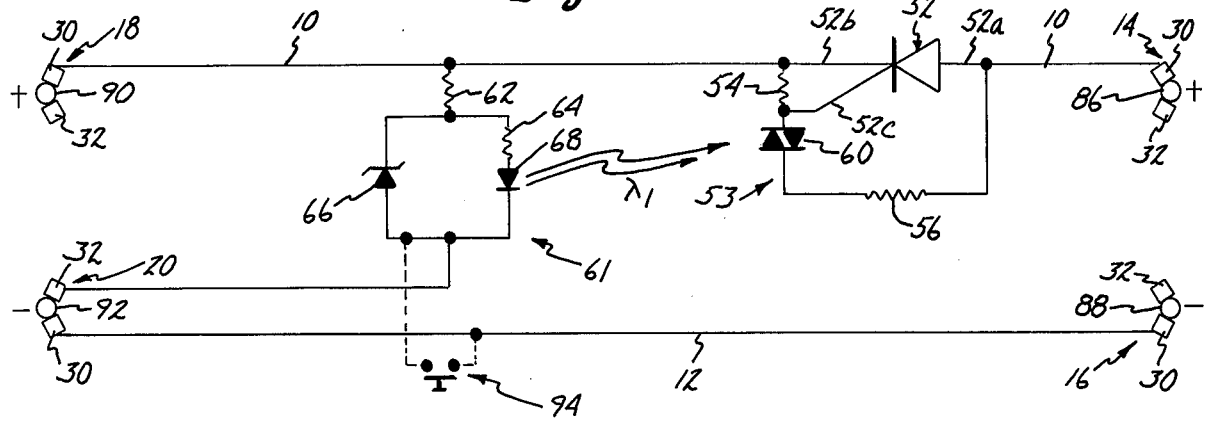

The Circuit of FIG. 6

The circuit of FIG. 6 (and also FIG. 7) shows a circuit which is generally similar to the circuit shown in FIG. 5, but use fewer components. In FIG. 6 (and 7), elements similar to those shown in FIG. 5 are designated by similar reference letters and numerals.

In the circuit of FIG. 6, SCR 52 is again connected in the current path between connectors 14 and 18. Gate circuit 53 is connected to gate electrode 52c in a manner similar to that shown in FIG. 5. Voltage sensing circuit 61 is connected between jaw 30 of connector 18 and jaw 32 of connector 20 in a manner similar to that shown in FIG. 5.

The circuit of FIG. 6 differs from that of FIG. 5 in that second SCR 70, second gating circuit 71 and second voltage sensing circuit 77 which are included in the circuit of FIG. 5 are not included in the circuit of FIG. 6. Instead, cable 12 provides a direct electrical connection between jaws 30 of connectors 16 and 20.

The circuit of FIG. 6 operates in a similar manner to that shown in FIG. 5. The apparatus is shown with the proper connections made by connectors 14 16 to the plus and minus terminals 86 and 88, respectively, of the rescue vehicle; and with connectors 18 and 20 making proper connections to the positive and negative terminals 90 and 92, respectively, of the disabled vehicle. With these connections, voltage sensing circuit 61 senses proper polarity between connectors 18 and 20, and SCR 52 senses proper voltage between connectors 14 and 18. This permits the SCR 52 to be turned on, permitting current to flow from terminal 86 of the rescue vehicle to terminal 90 of the disabled vehicle and from terminal 92 of the disabled vehicle to terminal 88 of the rescue vehicle. The circuit of FIG. 6 provides reverse polarity protection and short circuit protection. There is one condition, however, in which the circuit of FIG. 6 will not prevent improper connections. This is when the bumpers of the rescue vehicle and the disabled vehicle are in contact, so that a short is provided between negative terminals 88 and 92. In this situation, if connector 16 is connected to the plus terminal 86 of the rescue vehicle, conduction can occur, since there is no circuit element in cable 12 to prevent conduction. Provided this condition is avoided, however, the circuitry of FIG. 6 is an effective circuit for preventing reverse connection or short circuiting of jumper cables.

The circuit shown in FIG. 6 also illustrates an alternative switch 94 which is connected between voltage sensing circuit 61 and cable 12. If switch 94 is used, then the connection made between voltage sensing circuit 61 and jaw 32 of connector 20 is not used. Switch 94 is preferably a remote switch, which permits the operator to initiate operation of the jumper cables from a distance. This remote operation of the jumper cable apparatus is an advantageous safety feature. In addition, since the special switch formed by the jaws 30 and 32 of connector 20 is no longer required, conventional connectors can be used rather than the special connectors as illustrated in FIGS. 2–4.

Figure 7:
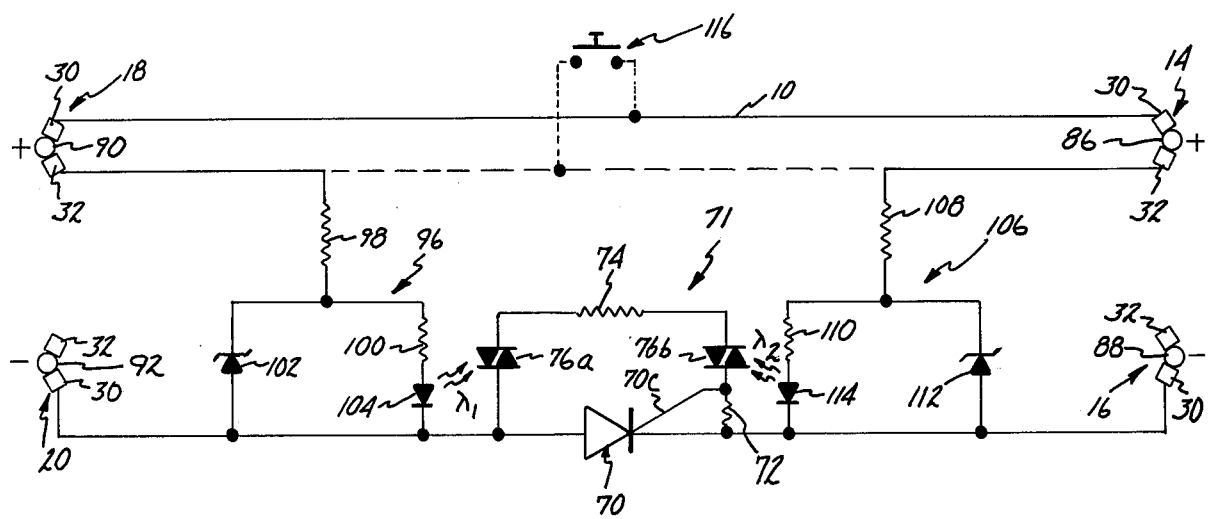

The Circuit of FIG. 7

FIG. 7 shows another circuit which uses only a single SCR. In the circuit shown in FIG. 7, SCR 70 is provided in the current path between terminals 30 of connectors 16 and 20. Cable 10 directly connects jaws 30 of connectors 14 and 18. In the embodiments shown in FIG. 7, gate circuit 71 includes a pair of photosensitive triacs 76a and 76b. Triac 76a is controlled by a voltage sensing circuit 96 which includes resistors 98 and 100, Zener diode 102 and light emitting diode 104. Voltage sensing circuit 96 senses voltage between jaw 32 of connector 18 and jaw 30 of connector 20. Triac 76b is controlled by voltage sensing circuit 106, which includes resistors 108 and 110, Zener diode 112 and light emitting diode 114. Voltage sensing circuit 106 senses voltage between jaw 32 of connector 14 and jaw 30 of connector 16. In the circuit of FIG. 7, voltage sensing circuits 96 and 106 must both sense voltages of the proper polarity and magnitude before a gate signal can be applied to gate electrode 70c of SCR 70. In addition, SCR 70 will not conduct, even if a gate signal is present, if connector 20 is not more positive than connector 16. The circuit of FIG. 7, therefore, senses three voltage conditions, the voltage between connectors 14 and 16, the voltage between connectors 18 and 20, and the voltage between connectors 16 and 20.

Also shown in FIG. 7 is alternate hand-held switch 116 which is connected to voltage sensing circuits 96 and 106. When alternate hand-held switch 116 is used and connected as shown in dashed lines in FIG. 7, the connections to jaws 32 of connectors 14 and 18 are not used. As in the circuit shown in FIG. 6, the use of a remote hand-held switch permits the use of conventional connectors, and provides a desirable safety feature, since the operator is permitted to stand clear of the vehicles before initiating operation of the circuit. The circuit of FIG. 7 provides protection against reverse connection and short circuit connection of connectors 14 and 16 and connectors 18 and 20. Because cable 10 makes a direct connection between connectors 14 and 18, however, a potential unsafe condition can occur if the bumpers of the vehicles are in contact, so as to provide a ground path between negative terminals 88 and 92 of the two vehicles. Provided this condition is not present, however, the circuit of FIG. 7 provides the desirable protective features with only one rather than two high current SCRs.

Figure 8:
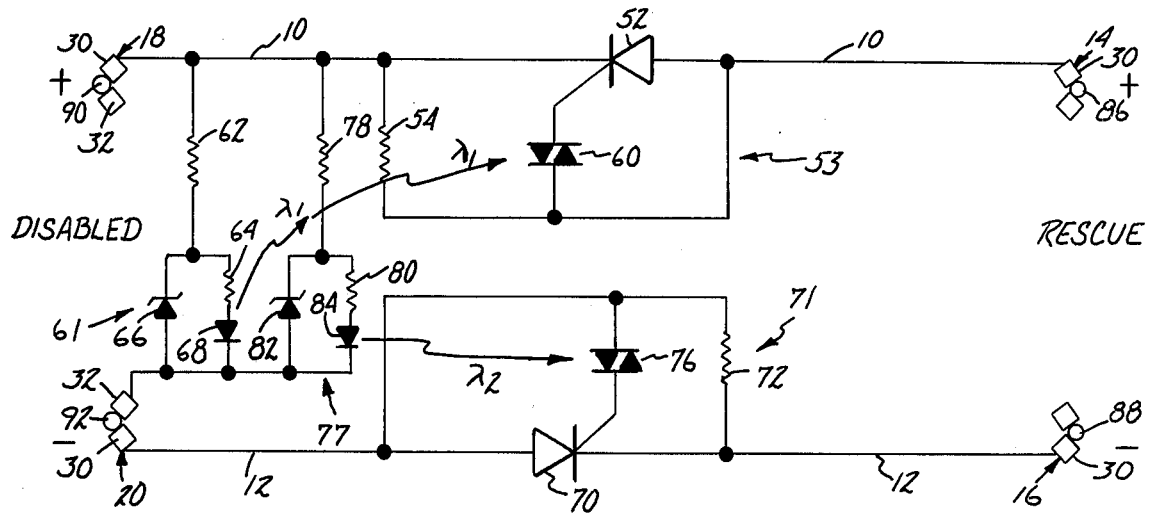

The Circuit of FIG. 8

FIG. 8 shows another embodiment of the present invention which is generally similar to the circuit shown in FIG. 5. Similar elements are designated with similar numerals and letters. In the circuit of FIG. 8, SCR 52 is connected in series with first cable 10 between first connector 14 and third connector 18. SCR 70 is connected in series with second cable 12 between second connector 16 and fourth connector 20.

The circuit of FIG. 8 differs from that of FIG. 5 in two respects. First, the gate control circuits 53 and 71 in the circuit of FIG. 8 differ from those shown in FIG. 5. In particular, resistor 54 in FIG. 8 is connected between anode and cathode of SCR 52 and photosensitive triac 60 is connected between gate and anode of SCR 52. Similarly, resistor 72 is connected between anode and cathode of SCR 70, and photosensitive triac 76 is connected between gate and anode of SCR 70. It has been found that this arrangement of gate circuits 53 and 71 provides greater sensitivity and reduces the number of components required from that shown in FIG. 5.

Second, in the circuit shown in FIG. 8, both voltage sensing circuits 61 and 77 are connected between jaw 30 of connector 18 and jaw 32 of connector 20. In other words, voltage sensing circuits 61 and 77 both sense the same voltage (i.e. the voltage between connectors 18 and 20) and permit operation of SCR 52 and SCR 70 only when this voltage has a predetermined polarity and magnitude. Sensing voltage only at the disabled vehicle is possible, since SCRs 52 and 70 are undirectional current control devices. SCR 52 will not operate unless the voltage between connector 14 and connector 18 has the proper polarity. Similarly, SCR 70 will not operate unless the voltage between connectors 16 and 20 has the proper polarity. The circuit of FIG. 8, therefore, monitors the voltage between connectors 14 and 18, the voltage between connectors 16 and 20, and the voltage between connectors 18 and 20. Only if all three of these voltages have the proper polarity and magnitude will the circuit permit operation of these jumper cables. Thus, in effect the circuit also monitors the voltage between connectors 14 and 16.

Figure 9:
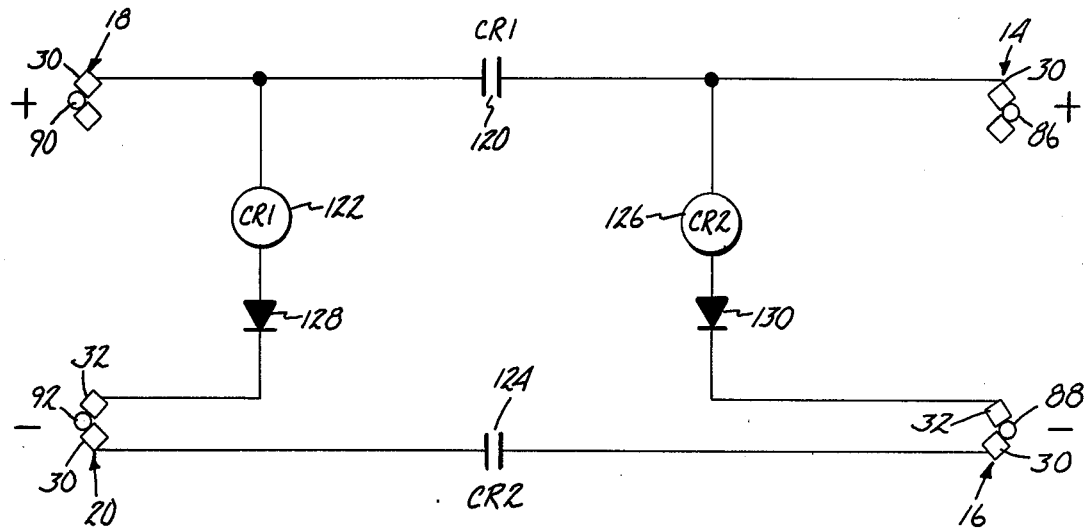

The Circuit of FIG. 9

Each of the circuits shown in FIGS. 5 through 8 uses an SCR as the switching device connected in series with jumper cables 10 and/or 12. FIG. 9 shows another embodiment of the circuit of the present invention which utilizes relays rather than SCRs as the switching devices.

In the circuit of FIG. 9, a first relay CR1 having contacts 120 and coil 122 controls current flow between first connector 14 and second connector 18. Similarly, a second relay CR2 having contacts 124 and coil 126 control current flow between connectors 16 and 20. Operation of contacts 120 of relay CR1 is controlled by coil 122, which is connected in series with diode 128 between jaw 30 of connector 18 and jaw 32 of connector 20. Similarly, operation of contacts 124 of relay CR2 is controlled by coil 126, which is connected in series with diode 130 between jaw 30 of connector 14 and jaw 32 of connector 16. The contacts 120 and 124 of relays CR1 and CR2, respectively, close only if connector 18 is connected to a positive terminal with respect to connector 20, and if connector 14 is connected to a positive terminal with respect to connector 16.

Because relays CR1 and CR2 permit current flow in either direction, the circuit of FIG. 9 does not depend upon having a particular end connected to the disabled vehicle and the other end connected to the rescue vehicle. The circuit provides protection against cross connection of connectors at either end, and also provides short circuit protection. If, for example, connectors 14 and 16 are shorted together, coil 126 of relay CR2 is deenergized, thereby causing contacts 124 to open. Similarly, shorting of connectors 18 and 20 deenergizes relay coil 122 of relay CR1, thereby opening contacts 120 of CR1.

The circuit of FIG. 9 operates satisfactorily so long as the two vehicles are not in contact so as to provide a ground path between the two vehicles. If the two vehicles are in contact so as to provide a ground connection, shorting can occur if one of the two vehicles is properly connected and the other vehicle is reverse connected. So long as the two vehicles are maintained out of physical contact with one another, however, the circuit of FIG. 9 is effective in preventing both reverse connections and shorting of the connectors, and thus represents a significant improvement over conventional jumper cables.

Figure 10:
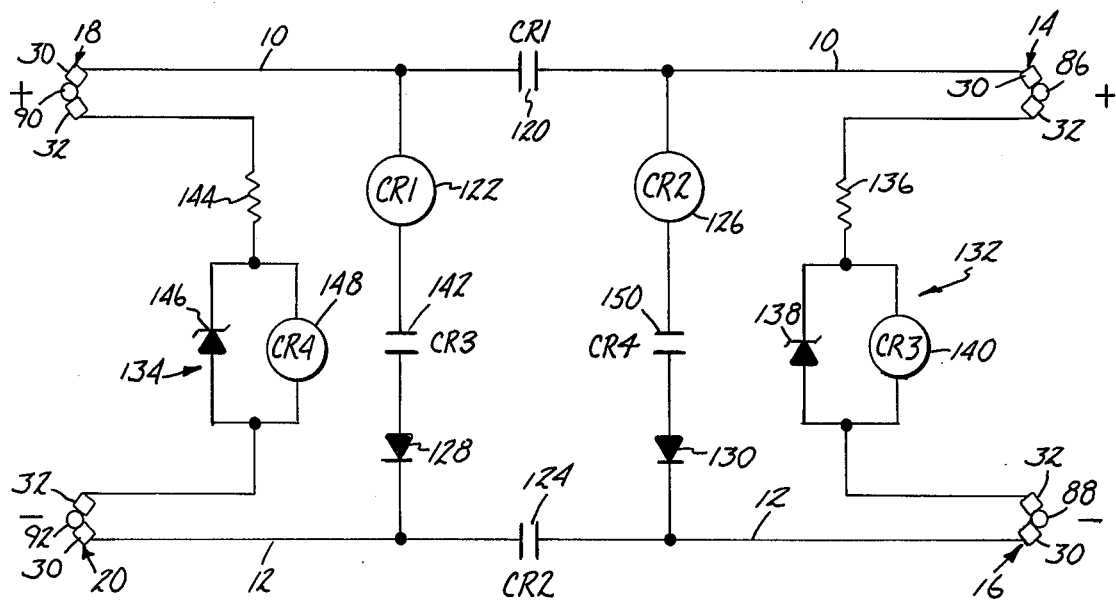

The Circuit of FIG. 10

FIG. 10 shows another embodiment of the present invention which, like the circuit of FIG. 9, uses first relay CR1 to control current flow between connectors 14 and 18 and second relay CR2 to control current flow between connectors 16 and 20. Contacts 120 of CR1 are again connected in series with cable 10 between connectors 14 and 18. Contacts 124 of CR2 are again connected between connectors 16 and 20.

The circuit of FIG. 10 differs from the circuit of FIG. 9 in that it includes additional voltage sensing circuits 132 and 134. Voltage sensing circuit 132 is connected between jaws 32 of connectors 14 and 16, and includes resistor 136, Zener diode 138, and coil 140 of third relay CR3. Contacts 142 of relay CR3 are connected in series with coil 122 of CR1 and diode 128 between jaws 30 of connectors 18 and 20.

Voltage sensing circuit 134 is connected between jaws 32 of connectors 18 and 20. Voltage sensing circuit 134 includes resistor 144, Zener diode 146, and coil 148 of fourth relay CR4. Contacts 150 of fourth relay CR4 are connected in series with coil 126 of CR2 and diode 130 between jaws 30 of connectors 14 and 16.

Zener diode 138 and coil 140 of voltage detector circuit 132 are selected so that coil CR3 is energized only when connector 14 is positive with respect to connector 16. When the polarities of connectors 14 and 16 are reversed, the forward bias voltage drop across Zener diode 138 is an insufficient voltage to energize coil 140. Zener diode 146 and coil 148 of voltage detector circuit 134 are selected in a similar manner, so that coil 148 is energized only when connector 18 is positive with respect to connector 20.

With the circuit of FIG. 10, therefore, contacts 120 of relay CR1 are closed only when the voltages between connectors at both ends of the cable have the proper polarity and have sufficient magnitude to energize the coils. If the voltage between connectors 14 and 16 is improper polarity, or connectors 14 and 16 are shorted, coil 140 of CR3 is not energized, and contacts 142 of CR3 remain open, thus preventing coil 122 from being energized. If connectors 18 and 20 are improperly connected or shorted, relay CR1 will not be energized.

Similarly, contacts 124 of CR2 are closed only if connectors at both ends of cable are properly connected, and not shorted. If connectors 18 and 20 are reverse connected or shorted, coil 148 of CR4 is not energized, and contacts 150 of CR4 remain open, thus preventing energization of coil 126 of CR2. In addition, if the polarity of voltage between connectors 14 and 16 is reversed, or they are shorted, coil 126 of CR2 will not be energized.

Because the circuit of FIG. 10 requires the connectors at both ends of the cable to be properly connected in order to close contacts 120 and contacts 124, it provides protection against reverse polarity connections even in the event that the two vehicles are grounded together. The circuit shown in FIG. 10 has another important advantage. It prevents arcing at a contact post in the event that the operator removes one of the connectors from the battery terminal temporarily, and then replaces the connector onto the terminal. This protection is provided by voltage sensing circuits 132 and 134, which are connected between the insulated jaws 32 of the respective connectors. When a connector is removed from the battery terminal, the circuitry of FIG. 10 causes both relays CR1 and CR2 to be deenergized, and contacts 120 and 124 to open.

Figure 11:
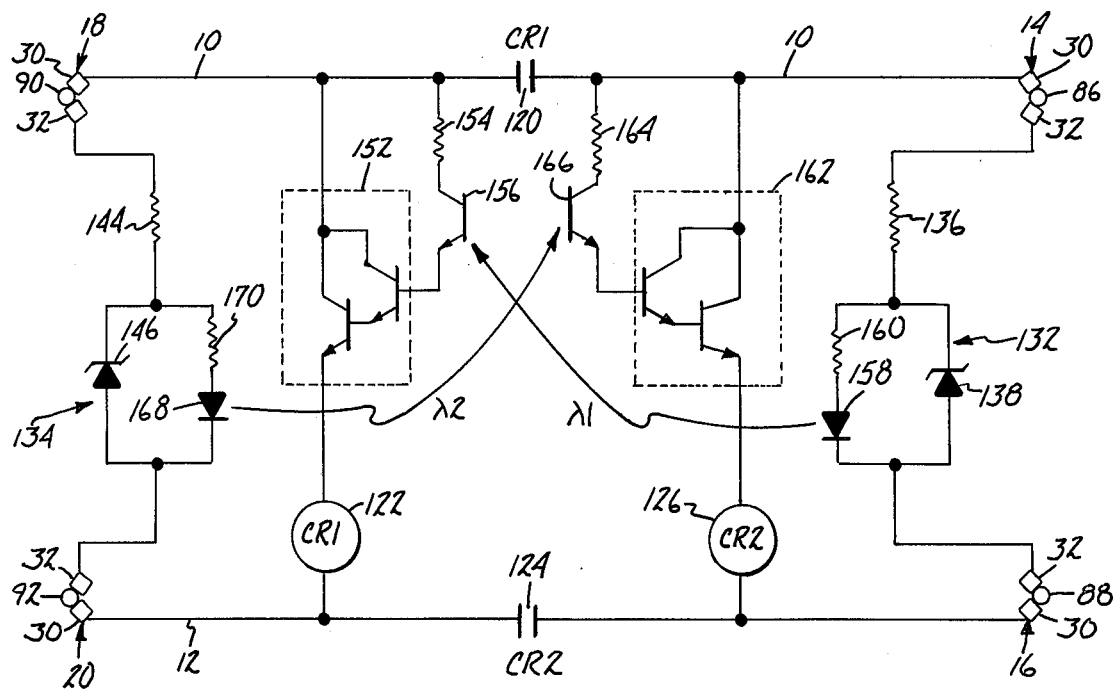

The Circuit of FIG. 11

FIG. 11 shows a circuit which is similar in operation to the circuit of FIG. 10, but uses solid state components rather than third and fourth relays CR3 and CR4 as shown in FIG. 10. In the circuit shown in FIG. 11, relay coil 122 of CR1 is connected in a control circuit path with Darlington transistor 152 between jaws 30 of connectors 18 and 20. A control current is supplied to the base of Darlington transistor 152 by resistor 154 and phototransistor 126. Phototransistor 156 is controlled by light from light emitting diode 158 of voltage sensing circuit 132. Light emitting diode 158 and resistor 160 are connected in parallel with Zener diode 138 of voltage sensing circuit 132 (i.e. in place of relay coil 140 shown in FIG. 10). When voltage of proper polarity and magnitude is present between connectors 14 and 16, light emitting diode 158 emits light, thereby turning on phototransistor 156. This supplies current to the base of Darlington transistor 152, which will turn on provided the voltage between connectors 18 and 20 is of the proper polarity and magnitude. Thus coil 122 of relay CR1 is energized only if the proper voltage is present between connectors 14 and 16 to actuate light emitting diode 158; and the proper voltage is present between connectors 16 and 20 to permit current flow through the collector—emitter current path of Darlington transistor 152.

Relay coil 126 of CR2 is controlled in a similar manner. Coil 126 is connected with the collector—emitter current path of Darlington transistor 162 between jaws 30 of connectors 14 and 16. Current is supplied to the base of Darlington transistor 162 by resistor 164 and phototransistor 166. Light emitting diode 168 of voltage sensing circuit 134 supplies light to phototransistor 166 when voltage between connectors 18 and 20 is of the proper polarity and magnitude. Light emitting diode 168 and resistor 170 are connected in parallel with Zener diode 146 of voltage sensing circuit 134.

Coil 126 of CR2 is energized only if the voltage between connectors 14 and 16 permits current flow through the collector—emitter current path of Darlington transistor 162, and if the voltage between connectors 18 and 20 is of the proper polarity and magnitude so that light emitting diode 168 supplies light to phototransistor 166.

Like the circuit of FIG. 10, the circuit of FIG. 11 provides reverse polarity and short circuit protection even in the event that the vehicles are in electrical contact. In addition, the circuit of FIG. 11 also provides protection against arcing in the event that the operator removes one of the connectors temporarily and then replaces the connector on the terminal. Whenever one of the connectors is removed, both contacts 120 of CR1 and contacts 124 of tR2 open.

Conclusion

Although the circuits of FIGS. 5 through 11 illustrate various desirable circuits for the safety jumper cables of the present invention, other circuits and circuit components can also be used. For example, although photosensitive triacs and phototransistors have been specifically shown in some of the circuits, other photosensitive switch devices, such as light activated SCR (LASCR) can also be used. In addition, as illustrated in FIGS. 10 and 11, relays can be used as part of the voltage sensing circuitry, rather than light emitting diodes and photosensitive switching devices.

Similarly, although SCRs and relays are specifically shown in the circuits of FIGS. 5-11, other current control switching devices can also be used, provided that they have the necessary current carrying capabilities for use in jumper cables.

Although the present invention has been described with reference to preferred embodiments, workers skilled in the art will recognize that changes may be made in form and detail without departing from the spirit and scope of the invention.

What is claimed is:

1. Jumper cable apparatus for providing, when properly connected, a connection between positive terminals of the electrical systems of first and second vehicles and between negative terminals of the electrical systems of the first and second vehicles, the jumper cable apparatus comprising:

first and second connector means for user-selected removable connection to the positive and negative electrical terminals, respectively, of the electrical system of the first vehicle when properly connected;

third and fourth connector means for user-selected removable connection to the positive and negative electrical terminals, respectively, of the electrical system of the second vehicle when properly connected;

first cable means for providing a first current path between the first and third connector means;

second cable means for providing a second current path between the second and fourth connector means; and control means for preventing current flow in the first and second current paths unless (a) a first voltage between the third and fourth connector means has a polarity in which the third connector means is more positive than the fourth connector means and a magnitude greater than a predetermined threshold level, and (b) a second voltage between the first connector means and one other of the second, third and fourth connector means has a predetermined polarity in which the first connector means is more positive than the one other of the second, third and fourth connector means and a magnitude greater than a predetermined threshold level, thus indicating that the first, second, third and fourth connectors are all connected properly, wherein the control means comprises:

first switch means connected in the first current path and having a conductive state which permits current flow through the first path and a nonconductive state which blocks current flow through the first path;

first switch control means for controlling the state of the first switch means as a function of the first and second voltages;

second switch means connected in the second current path and having a conductive state which permits current flow through the second path and a nonconductive state which blocks current flow through the second path; and second switch control means for controlling the state of the second switch means as a function of the first and second voltages.

2. The apparatus of claim 1 wherein the second voltage is between the first and second connector means.

3. The apparatus of claim 2 wherein the first switch control means comprises first voltage sensing means for sensing the second voltage between the first and second connector means and second voltage sensing means for sensing the first voltage between the third and fourth connector means; and wherein the second switch control means comprises third voltage sensing means for sensing the first voltage between the third and fourth connector means and fourth voltage sensing means for sensing the second voltage between the first and second connector means.

4. The apparatus of claim 3 wherein the second voltage sensing means comprises:

means for switching the first switch means to a conductive state when energized;

means for permitting energization only when the first voltage between the third and fourth connector means has a polarity in which the third connector means is more positive than the fourth connector means and a magnitude greater than a predetermined threshold level; and means controlled by the first voltage sensing means for permitting energization only when the second voltage sensed by the first voltage sensing means has a polarity in which the first connector means is more positive than the second connector means and a magnitude greater than a predetermined threshold level.

5. The apparatus of claim 4 wherein the fourth voltage sensing means comprises:

means for switching the second switch means to a conductive state when energized;

means for preventing energization unless the second voltage between the first and second connector means has a polarity in which the first connector means is more positive than the second connector means and a magnitude greater than a predetermined threshold level; and means controlled by the third voltage sensing means for permitting energization only when the first voltage sensed by the third voltage sensing means has a polarity in which the third connector means is more positive than the fourth connector means and a magnitude greater than a predetermined threshold level.

6. The apparatus of claim 5 wherein the first switch means comprises first relay contacts, wherein the second switch means comprises second relay contacts; wherein the means for switching the first switch means comprises a first relay coil; and wherein the means for switching the second switch means comprises a second relay coil.

7. The apparatus of claim 3 wherein each of the connector means has first and second electrically isolated jaws, the first jaw of the first connector means being connected to a first end of the first cable means, the first jaw of the second connector means being connected to a first end of the second cable means, the first jaw of the third connector means being connected to a second end of the first cable means, and the first jaw of the fourth connector means being connected to a second end of the second cable means; and wherein the first voltage sensing means is connected between the second jaw of the first connector means and the second jaw of the second connector means, and the third voltage sensing means is connected between the second jaw of the third connector means and the second jaw of the fourth connector means.

8. The apparatus of claim 1 wherein the control means includes a voltage sensing means for sensing the first voltage between the third and fourth connector means, and wherein the third connector means has first and second electrically isolated jaws, the first jaw being connected to the first cable means and the second jaw being connected to the voltage sensing means.

9. Jumper cable apparatus for providing, when properly connected, a first current path for electrical current flow from a positive terminal of an electrical system of a rescue vehicle to a positive terminal of an electrical system of a disabled vehicle, and a second current path for electrical current flow from a negative terminal of the electrical system of the disabled vehicle to a negative terminal of the electrical system of the rescue vehicle, and for preventing current flow in the first and second current paths in the event of an improper connection, the jumper cable apparatus comprising:

first and second connector means for user-selected removable connection to the positive and negative electrical terminals, respectively, of the electrical system of the rescue vehicle when properly connected;

third and fourth connector means for user-selected removable connection to the positive and negative electrical terminals, respectively, of the electrical system of the disabled vehicle when properly connected;

first cable means for providing the first current path between the first and third connectors;

second cable means for providing the second current path between the second and fourth connectors;

first control means connected in the first current path for permitting current flow between the first and third connector means only when (a) a first voltage between the third and fourth connector means has a predetermined polarity in which the third connector means is more positive than the fourth connector means and a magnitude greater than a predetermined threshold level, and (b) a second voltage between the first connector means and one other of the second, third, and fourth connector means has a predetermined polarity in which the first connector means is more positive and a magnitude greater than the predetermined threshold level; and second control means connected in the second current path for permitting the current flow between the second and fourth connector means only when the first and second voltages each have the predetermined polarity and a magnitude greater than the predetermined threshold level.

10. The apparatus of claim 10 wherein the second voltage is between the first and second connector means, and the predetermined polarity is one in which the first connector means is more positive than the second conductor means.

11. The apparatus of claim 10 wherein the second control means permits current flow between the second and fourth connector means only when (a) the first voltage between the third and fourth connector means has a polarity in which the third connector means is more positive than the fourth connector means and a magnitude greater than a predetermined threshold level, and (b) the second voltage is between the first and second connector means and has a polarity in which the first connector means is more positive than the second connector means and a magnitude greater than a predetermined threshold level.

12. Jumper cable apparatus for connecting together positive terminals and connecting together negative terminals of electrical systems of first and second vehicles, and for preventing occurrence of a hazardous condition in the event of an improper connection, the jumper cable apparatus comprising:

first and second connector means for user-selected removable connection to the positive and negative terminals, respectively, of the electrical system of the first vehicle when properly connected;

third and fourth connector means for user-selected removable connection to the positive and negative terminals, respectively, of the electrical system of the second vehicle when properly connected;

first cable means for providing a first current path between the first and third connector means;

second cable means for providing a second current path between the second and fourth connector means;

first control means connected in the first current path for permitting current flow between the first and third connector means only when a first voltage between the third and fourth connector means has a predetermined polarity in which the third connector means is more positive and a magnitude greater than a predetermined threshold level and a second voltage has a predetermined polarity in which the first connector means is more positive and a magnitude greater than a predetermined threshold level and a second voltage has a predetermined polarity in which the first connector means is more positive and a magnitude greater than a predetermined threshold level; and second control means connected in the second current path for permitting current flow between the second and fourth connector means only when the first voltage has the predetermined polarity in which the third connector means is more positive and a magnitude greater than a predetermined threshold level and the second voltage between the first and second connector means has the predetermined polarity in which the first connector means is more positive and a magnitude greater than a predetermined threshold level.

* * * * *